US010694261B2

(12) United States Patent
Brown et al.

(10) Patent No.: US 10,694,261 B2
(45) Date of Patent: *Jun. 23, 2020

(54) OPTIMIZED DELIVERY TECHNIQUES

(71) Applicant: Comcast Cable Communications, LLC, Philadelphia, PA (US)

(72) Inventors: Tom Brown, West Chester, PA (US); Rick Gasloli, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,554

(22) Filed: Mar. 4, 2019

(65) Prior Publication Data

US 2019/0253766 A1 Aug. 15, 2019

Related U.S. Application Data

(63) Continuation of application No. 15/851,192, filed on Dec. 21, 2017, now Pat. No. 10,264,326, which is a
(Continued)

(51) Int. Cl.
*H04N 21/647* (2011.01)
*H04L 12/66* (2006.01)
(Continued)

(52) U.S. Cl.
CPC ....... *H04N 21/64738* (2013.01); *H04L 12/66* (2013.01); *H04L 43/0876* (2013.01);
(Continued)

(58) Field of Classification Search
CPC ............. H04L 12/2668; H04L 12/2671; H04L 12/2673; H04L 43/0876; H04L 43/0882;
(Continued)

(56) References Cited

U.S. PATENT DOCUMENTS 6,324,184 B1 * 11/2001 Hou ..................... H04L 12/2801
370/468
7,023,839 B1 * 4/2006 Shaffer ................. H04L 1/0014
370/356
(Continued)

OTHER PUBLICATIONS

U.S. Appl. No. 13/618,199, Controlling Delivery of Requested Content Based on Delivery Bandwidth Limitations, filed Sep. 14, 2012.

Primary Examiner — Jung Liu
(74) Attorney, Agent, or Firm — Banner & Witcoff, Ltd.

(57) ABSTRACT

Systems and methods are described that relate to on-demand compression for electronic data, such as media content, through a communication pathway. The communication pathway may be configured to multicast media content to a plurality of end-users in a service group. In certain embodiments, the service group may comprise a service group node having a quadrature amplitude modulation device. In one exemplary method, it may be determined whether the amount of media content being transmitted meets a first utilization threshold. The determination may be based on, at least in part, by measurements taken at one or more electronic devices located throughout a network or system. If the first bandwidth utilization threshold is not met, media content may be transmitted in a first format. If the first bandwidth utilization threshold is met, at least a portion of the media content may be transmitted in a first optimized delivery technique.

20 Claims, 6 Drawing Sheets

Related U.S. Application Data continuation of application No. 14/854,483, filed on Sep. 15, 2015, now Pat. No. 9,888,295, which is a continuation of application No. 13/619,264, filed on Sep. 14, 2012, now Pat. No. 9,167,310.

(51) Int. Cl.
*H04L 12/26* (2006.01)
*H04N 21/2385* (2011.01)

(52) U.S. Cl.
CPC ......... *H04L 43/16* (2013.01); *H04N 21/2385* (2013.01); *H04N 21/64723* (2013.01)

(58) Field of Classification Search
CPC ............. H04L 43/0888; H04L 67/2828; H04L 29/0604; H04L 29/0651; H04L 29/08783; H04L 29/08792; H04L 47/38; H04L 69/04
See application file for complete search history.

(56) References Cited

U.S. PATENT DOCUMENTS

| | | | |
|---|---|---|---|
| 7,697,070 B1 | 4/2010 | Dugan et al. | |
| 7,770,200 B2 | 8/2010 | Brooks et al. | |
| 9,167,310 B2 | 10/2015 | Brown et al. | |
| 9,641,900 B2 | 5/2017 | Rahman | |
| 9,888,295 B2 | 2/2018 | Brown et al. | |
| 10,264,326 B2 | 4/2019 | Brown et al. | |
| 2002/0072885 A1* | 6/2002 | Tang | H04L 1/0003 703/3 |
| 2005/0289618 A1 | 12/2005 | Hardin | |
| 2006/0171390 A1 | 8/2006 | La Joie | |
| 2007/0099560 A1 | 5/2007 | Bowen et al. | |
| 2007/0101370 A1 | 5/2007 | Calderwood | |
| 2007/0116048 A1* | 5/2007 | Addington | H04J 3/16 370/468 |
| 2007/0133603 A1 | 6/2007 | Weaver et al. | |
| 2007/0157234 A1 | 7/2007 | Walker | |
| 2009/0028182 A1 | 1/2009 | Brooks et al. | |
| 2009/0060028 A1 | 3/2009 | Liu et al. | |
| 2009/0150958 A1 | 6/2009 | Jerding et al. | |
| 2009/0193485 A1 | 7/2009 | Rieger et al. | |
| 2010/0005499 A1 | 1/2010 | Covey | |
| 2010/0023579 A1 | 1/2010 | Chapweske et al. | |
| 2010/0306810 A1 | 12/2010 | Brooks et al. | |
| 2011/0072475 A1 | 3/2011 | McKiel, Jr. | |
| 2011/0102683 A1 | 5/2011 | Josephs | |
| 2011/0126247 A1 | 5/2011 | Howarter et al. | |
| 2013/0047182 A1 | 2/2013 | Gudlavenkatasiva et al. | |
| 2013/0128738 A1 | 5/2013 | Cohen et al. | |
| 2013/0179588 A1* | 7/2013 | McCarthy | H04N 21/23418 709/231 |
| 2013/0219423 A1 | 8/2013 | Prickett et al. | |
| 2013/0239154 A1 | 9/2013 | Bagasra | |
| 2013/0308470 A1 | 11/2013 | Bevan et al. | |
| 2014/0082212 A1 | 3/2014 | Garg et al. | |
| 2014/0082681 A1 | 3/2014 | Brown et al. | |

* cited by examiner

OPTIMIZED DELIVERY TECHNIQUES

CROSS-REFERENCE TO RELATED APPLICATIONS

This application is a continuation of U.S. patent application Ser. No. 15/851,192, filed on Dec. 21, 2017, which is a continuation application of U.S. patent application Ser. No. 14/854,483, filed on Sep. 15, 2015, which issued on Feb. 6, 2018 as U.S. Pat. No. 9,888,295, which is a continuation application of U.S. patent application Ser. No. 13/619,264, filed on Sep. 14, 2012, which issued on Oct. 20, 2015 as U.S. Pat. No. 9,167,310, the entire disclosures of which is herein incorporated by reference.

FIELD OF THE INVENTION

The present disclosure relates to systems and methods for delivering electronic information. Some aspects relate to optimized bandwidth utilization for transmitting data, such as media content.

BACKGROUND

Users may receive information from multiple communication systems. For example, a content delivery system may deliver data from a provider to a user. Data may include broadcast data, narrowcast data (e.g., video on-demand (VOD) and switched digital video (SDV) programming) and unicast data.

National or large-area distribution centers often are required to transmit large amounts of electronic information to regional distribution hubs. As such, communication pathways generally have high bandwidth capabilities. In turn, regional distribution hubs may connect several local distribution nodes that deliver content to several end-user locations, such as homes and businesses. Sub-regional communication pathways may have less bandwidth capabilities than regional systems, which in turn, have less bandwidth than larger (e.g., national) distribution centers. As demand increases, such as from population growth or increased user demand for content, new network equipment, such as distribution nodes, may have to be deployed. Planning, installing and maintaining new network equipment is a costly and time-consuming expenditure.

What is needed are improved systems and methods to optimize networks for delivery of data.

BRIEF SUMMARY

The following presents a simplified summary in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a non-transitory computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Some aspects of this disclosure relate to systems and methods of bandwidth optimization to deliver electronic information, such as data such as media content, through a communication pathway, such as a network. As used herein, media content may comprise analog and/or digital information representing audio, video, and combinations thereof. Exemplary media content will be explained in more detail below. In certain embodiments, the communication pathway may be a shared communication pathway. For example, the pathway may be configured to multicast media content to a plurality of end-users in a service group. In one example embodiment, a service group may comprise a service group node having a quadrature amplitude modulation device.

In one exemplary method, it may be determined whether data, such as for example, media content, transmitted through a shared communication pathway, operatively connected to one or more end-user locations within a service group, meets a first bandwidth utilization threshold. The determination may be based on, at least in part, by measurements taken at one or more devices located throughout a network. For example, utilization data may be received at a network interface in operative communication with one or more computer-readable mediums comprising computer-executable instructions that when executed by a processor determine whether one or more thresholds have been met. In other embodiments, only an indication of whether the first bandwidth utilization threshold is met may be received.

In certain embodiments, if the first bandwidth utilization threshold is not met, the delivery of data (which for example, may comprise media content) to at least a portion of the end-user locations may be transmitted in a first format. In another embodiment, if the first bandwidth utilization threshold is met, a first optimization technique may be applied. The first optimization technique may transmit the data in the first format. In some embodiments, the first optimization technique may transmit the data is a second format. In certain embodiments, a second indication may be received, such as through a network interface. The second indication may indicate whether the first bandwidth utilization threshold is met during a second time period. In one embodiment, the first time period precedes the second time period, and may comprise a substantially equivalent quantity of time. For example, each of the first and the second time periods may be about 5 minutes. In certain embodiments, the first and/or the second time period may be different.

If it is determined (or received information indicates) that the first predetermined bandwidth utilization threshold is met during the second time period, certain implementations may continue to transmit at least an additional portion of data (such as media content) using the first optimized delivery technique, and if the predetermined threshold is not met, at least an additional portion of the media content may be transmitted without utilizing the first optimization technique. In certain embodiments, a request for specific media content may be received before determining whether the first bandwidth utilization threshold is met.

In certain embodiments, a further indication (or determination) may be received of whether a quantity of data (such as media content) transmitted through a communication pathway to at least a portion of the plurality of end-user locations meets a second bandwidth utilization threshold. If the second threshold is not met, one embodiment may transmit media content to at least a portion of the end-user locations using the first optimized delivery technique, wherein if the first bandwidth utilization threshold is met, certain embodiments may transmit the media content using a second optimized delivery technique. Further embodiments may comprise a third, fourth, or any number of different optimization techniques. In this regard, the recitation of a "first", a "second" or other numerical-referenced designation is not intended to require a specific ranking or ordering of different optimization techniques, but instead is provided to convey a distinction between multiple techniques.

Some aspects relate to systems and methods for determining which and/or upon which one or more optimization technique(s) may be implemented for specific conditions. Certain embodiments may be implemented to receive an indication that either the first or the second bandwidth utilization threshold for the shared communications channel is met for a predefined period of time. In some embodiments, such an indication may result in the transmittal of data (such as media content) using a third optimized delivery technique. In certain embodiments, invocation of optimizing techniques may be utilized in determinations of expanding and/or upgrading components of a delivery network. For example, the quantity of invocations, frequency of invocations, durations of invocations, and/or other characteristics of any optimization techniques may be utilized to determine whether to expand or update one or more components of a communication pathway. In one embodiment, the quantity and or type of invocations may indicate a need to expand the physical capacity of the network. Further, persons of ordinary skill in the art will appreciate that other systems and methods may be implemented in conjunction with one or more aspects of various optimized delivery techniques disclosed herein. For example, depending on various embodiments, systems and methods may deny requests for use of bandwidth, add a new user, remove a user currently receiving content, and/or augment the bandwidth (increase or decrease) available to one or more users.

These and other embodiments are described below.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects may be practiced. It is to be understood that other embodiments may be utilized and structural and functional modifications may be made without departing from the scope of the present disclosure.

Some aspects described herein provide systems and methods relating to the on-demand optimization for transmission of electronic information, such as media content transmitted through a communication system. The disclosed aspects may be employed in various systems, such as HFC, coaxial cable, fiber optic, IP and wireless systems including any combinations thereof. While aspects will be described in terms of a cable system, the disclosure is not so limiting. In one embodiment, residential network gateway (RNG) and/or tru2Way™ protocols may be used in combination with a multimedia over coax alliance (MoCA) compatible device. In some embodiments, such as those shown in relation to FIG. 1A, one or more different types of network infrastructures may be utilized, either in isolation or in combination with other infrastructures.

Figure 1A:
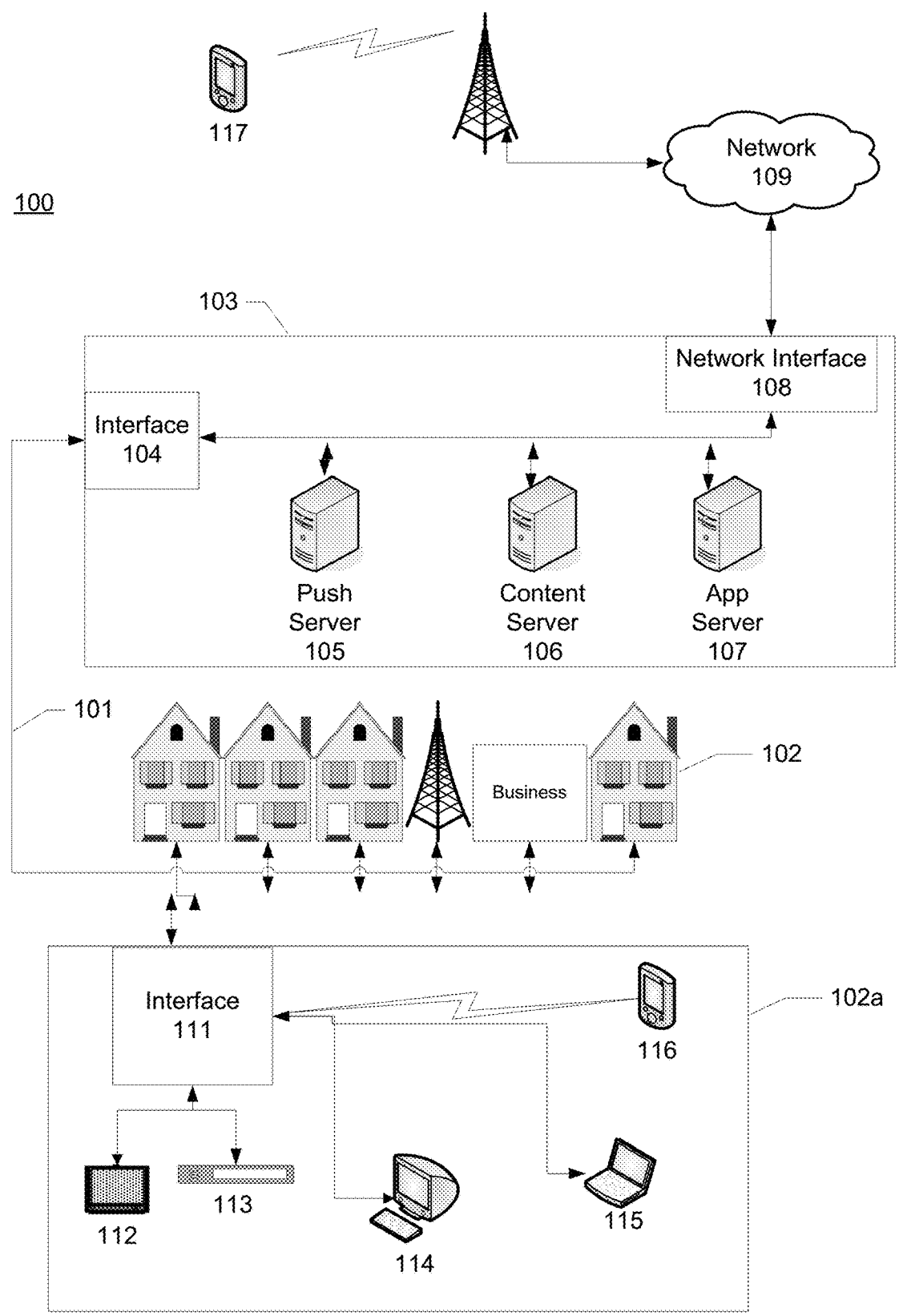
FIGS. 1A and 1B are illustrative networks and systems that may be utilized to implement one or more illustrative aspects described herein.

FIG. 1A illustrates an example information distribution network 100 on which many of the various features described herein may be implemented. Network 100 may be any type of information distribution network, such as cable, fiber, satellite, telephone, cellular, wireless, etc. One example may be an optical fiber network, a coaxial cable network or a hybrid fiber/coax distribution network. Network 100 may be variously configured such as having one or more wired or wireless communication channels 101 (e.g., coaxial cables, optical fibers, wireless, unicast, multicast, etc.) to connect one or more locations 102 (e.g., businesses, homes, consumer dwellings, network resources, etc.) to one or more data center(s) 103 (e.g., data center or headend). The data center 103 may transmit downstream information signals onto the channels 101, and each home 102 may have a receiver used to receive and process those signals. Those skilled in the art will readily appreciate that data center 103 may receive electronic information, such as data, from downstream devices, including but not limited to channels 101 or other components. Likewise data center 103 may transmit to and/or receive data from network 109.

In certain exemplary embodiments, channels 101 may comprise one line originating from the data center 103, and it may be split a number of times to distribute one or more signals to various locations 102. In one embodiment, one or more various locations 102 may be within the vicinity (which may be many miles) of the data center 103. The channels 101 may or may not include additional components. Where the communication channels 101 include additional components, these components may be such items such as splitters, filters, amplifiers. Portions of the channels 101 may also be implemented with fiber-optic cable, while other portions may be implemented with coaxial cable, other channels, or wireless communication paths. The data center 103 may include an interface 104 which may be variously configured. In one exemplary embodiment, the interface includes a modulator and a demodulator (modem). In one embodiment, QAM, such as Edge QAMs may be utilized. The data center 103 may include various backend devices such as processors and/or storage devices such as servers 105-107. The data center 103 may also include one or more network interfaces 108, which can permit the data center 103 to communicate with one or more networks 109 such as public, private, switched, or packet networks. Network(s) 109 may be variously configured to include one or more networks such as for example, the Internet devices, telephone networks, cellular networks, fiber networks, wireless networks (e.g., WiMAX), satellite networks, and any other desired network.

As noted above, the data center 103 may include a variety of servers such as one or more content server(s) 106 for distributing audio, video, and/or data content using one or more protocols. The content may be variously configured to include content such as, for example, video on demand movies, television programs, songs, text listings, etc. The content server 106 may be variously configured to include such items as, for example, software to validate user identities and entitlements, locate and retrieve requested content, encrypt the content, and initiate delivery (e.g., streaming) of the content to the requesting user and/or device.

The data center 103 may also include one or more application servers 107. An application server 107 may be variously configured to offer any desired service, and may run various languages and operating systems (e.g., servlets and JSP pages running on Tomcat/MySQL, OSX, BSD, Ubuntu, Redhat, HTML5, JavaScript, AJAX and COMET).

In one exemplary embodiment, an application server 107 may be configured for a specific environment such as a content distribution and/or monitoring environment. An example location 102a may include an interface device 111 which may be variously configured such as, for example, including one or more transmitters and/or receivers used to communicate with the data center using, for example channel(s) 101. The interface device 111 may be variously configured to communicate directly and/or indirectly with one or more devices local and/or remote to the location 102a. For example, these devices may include one or more terminals such as, for example, televisions 112, radios, music players, computing devices, a set-top box(s) (STB) 113, computers 114, laptops 115, digital video recorder(s) (DVR), computer server(s), wireless devices such as phones or tablets 116, and/or any other desired computing device. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, etc.

Figure 1B:
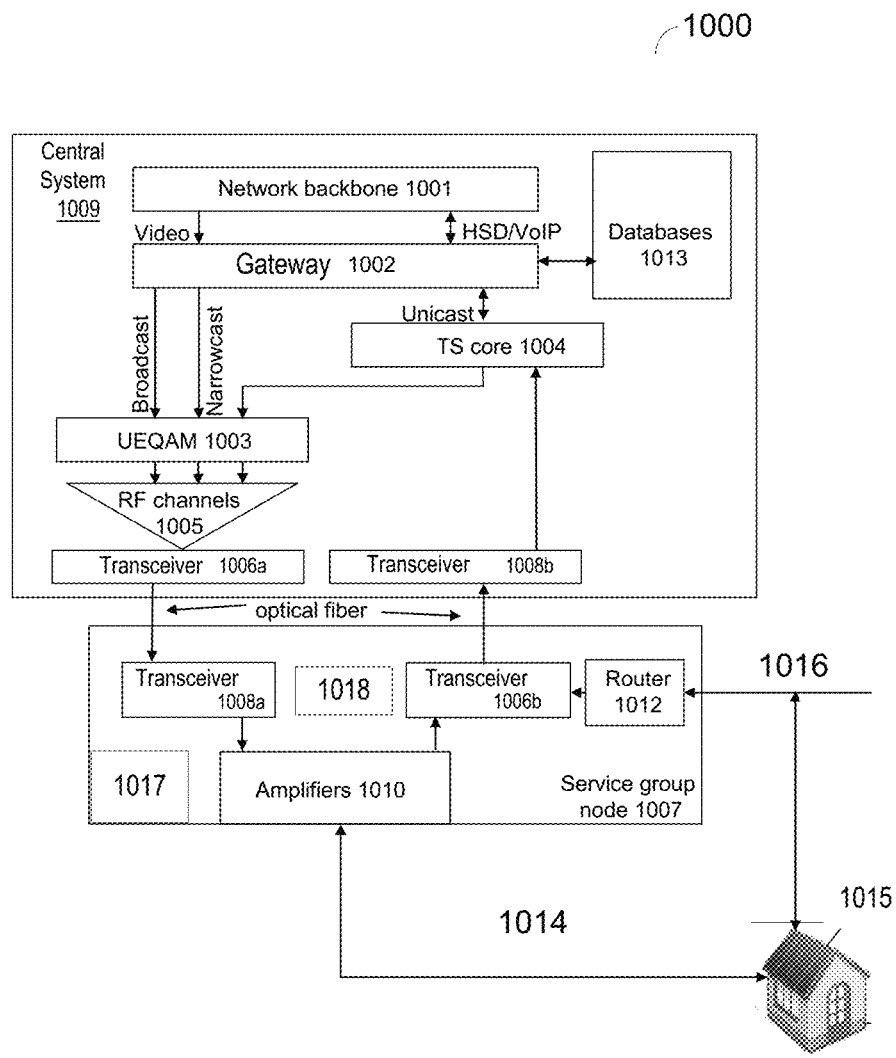

FIG. 1B provides another example of a distribution system 1000. System 1000 may be part of network 100 of FIG. 1A. Yet in other embodiments, system 1000 may be distinct and separate from network 100. In further embodiments, systems and methods may employ one or more components from one or both of network 100 and system 1000. In certain embodiments, exemplary system 1000 may be used for transmitting electronic information (e.g., media content) to a residence, or any other end-user location, such as a commercial establishment. FIG. 1B, which depicts an illustrative network, may (in certain embodiments) be a hybrid fiber coaxial (HFC) network. In the illustrative system 1000, a plurality of blocks correspond to example categories of network elements, and the arrows connecting those blocks indicate exemplary flows of data between those network elements. For example, data corresponding to services may be received from and sent to one or more backbone IP networks 1001 by gateways represented by block 1002. Service data may include broadcast data (e.g., television broadcast programming), narrowcast data (e.g., VOD and switched digital video (SDV) programming) and unicast data. The backbone network may be, e.g., a system operator's national IP network, the Internet, some combination of the Internet and a system operator's network etc. Several layers of gateways (e.g., at the national, regional and/or sub-regional levels) may be part of block 1002. In one embodiment, broadcast and/or narrowcast data may be routed to universal edge QAM (quadrature amplitude modulation) devices (UEQAMs) that may be located in distribution hubs, which devices are represented in FIG. 1B by block 1003. Unicast data may be routed to and from termination system (TS) cores 1004, with those TS cores also typically located in distribution hubs. Downstream unicast data may be sent from TS cores to UEQAMs. The UEQAMs then may modulate the broadcast, narrowcast and/or unicast downstream data into RF channels that are combined (block 1005) and communicated to transceivers 1006a/b for transmission (including, but not limited to fiber optic) to individual service group nodes (block 1007). Blocks 1001, 1002, 1003, 1004, 1005, 1006a/b, and 1008a/b (which may be transceivers configured to transmit upstream data) may generally comprise HFC components located at the service provider central system 1009.

System 1000 may comprise multiple distribution nodes, including, for example, service group node 1007. In one embodiment, service group node 1007 may convert the downstream signals (which may comprise optically-transmitted signals) to electrical signals for distribution over a communication pathway to subscriber devices such as modems, such as, but not limited to modems and media receivers, such as but not limited to set top boxes (STBs), media terminal adapters (MTAs), etc. Exemplary devices that may be located at end-user location 1015 are shown in the exemplary network of FIG. 2, which is described below. In certain systems, such as system 1000, these nodes typically comprise transceivers 1008 and amplifiers 1010 for boosting the electrical signals for transmission downstream via the communication pathway to end-user location 1015. Meanwhile, upstream transmissions from end-user location 1015 may be received at node 1007, converted to optical signals and may be forwarded to a transceiver 1008 by transceiver 1006. Transceiver 1008 then may forward signals to the TS cores 1004. In certain embodiments, transceiver 1006/1008 may comprise QAM transceivers.

Figure 2:
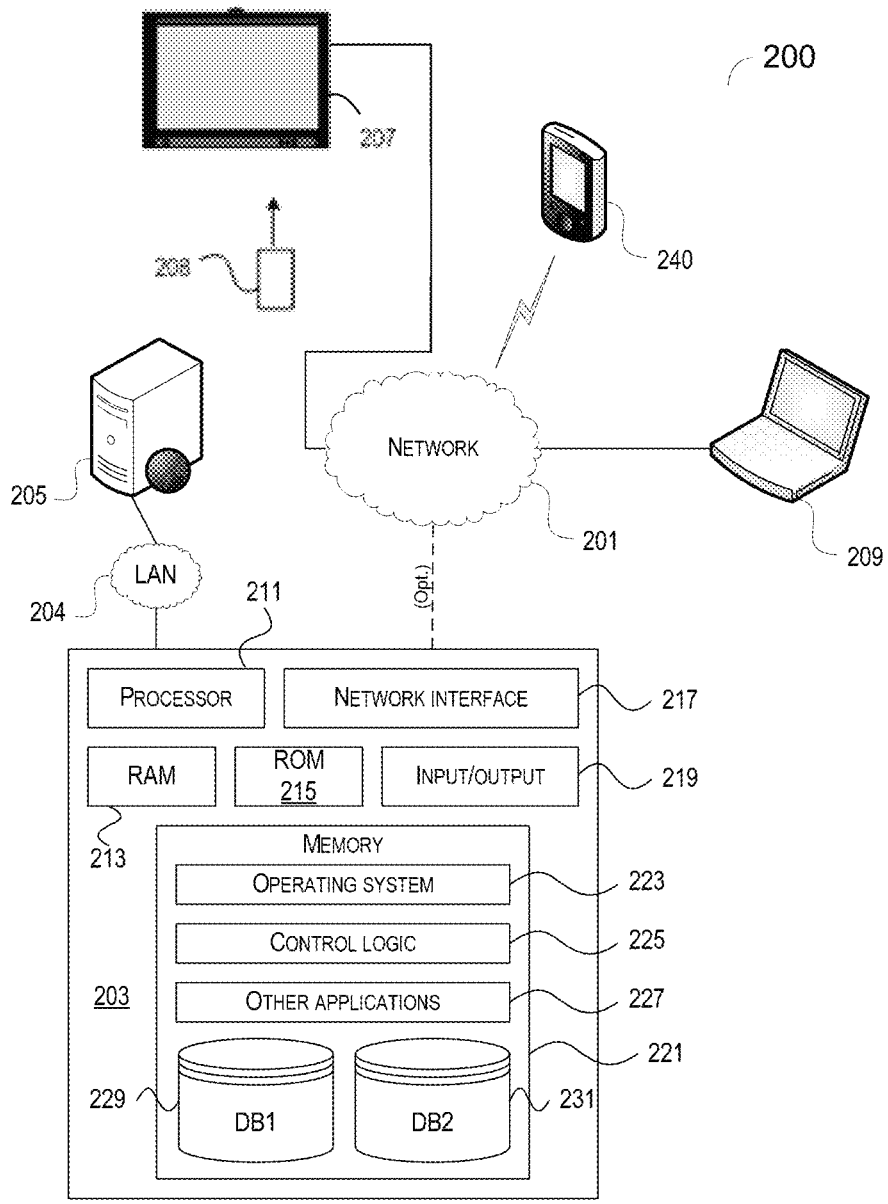
FIG. 2 illustrates a network with a computing device that may be used to implement one or more illustrative aspects described herein.
Figure 3A:
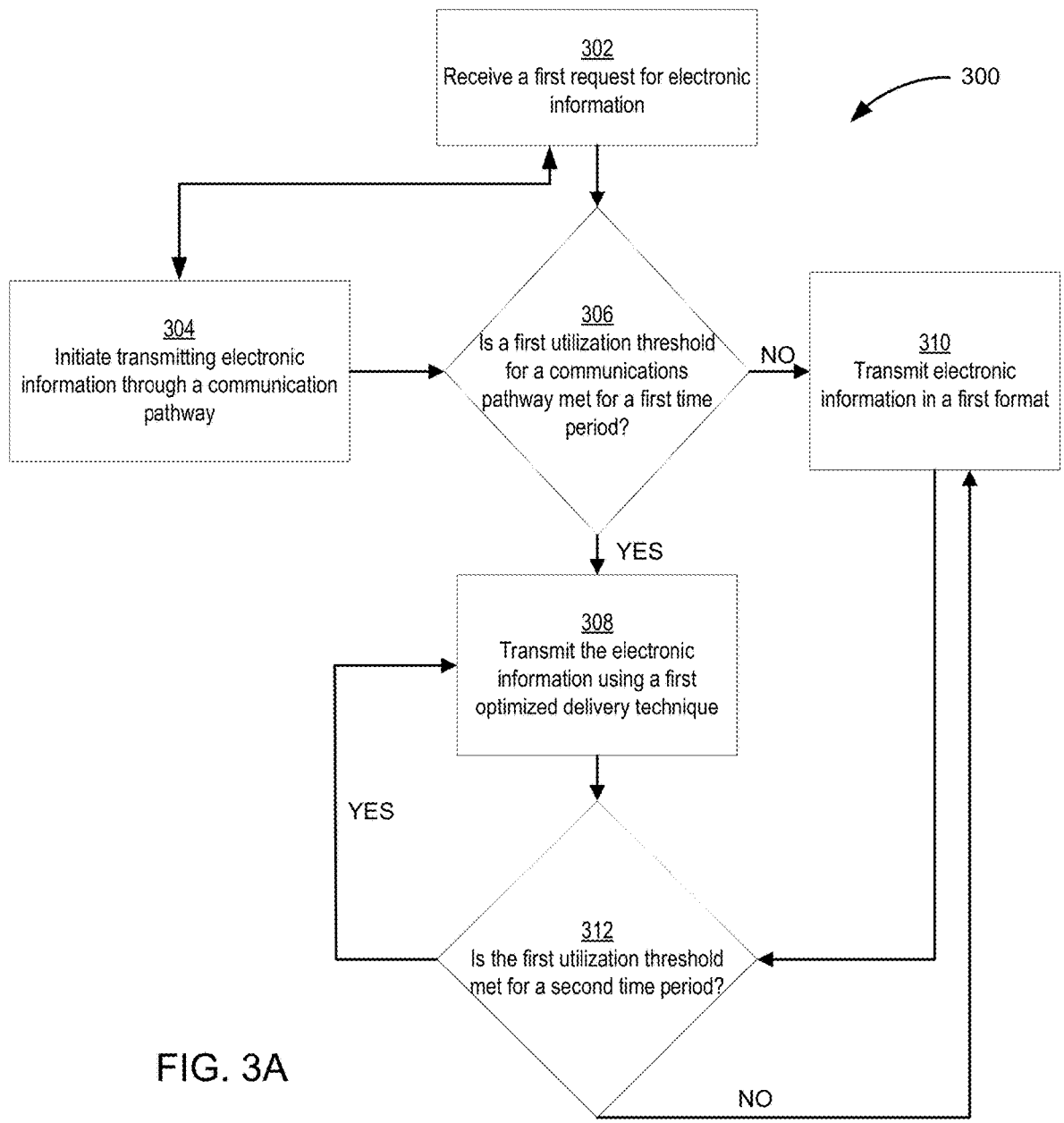
FIGS. 3A and 3B are flowcharts that may be used to implement one or more illustrative aspects described herein.
Figure 3B:
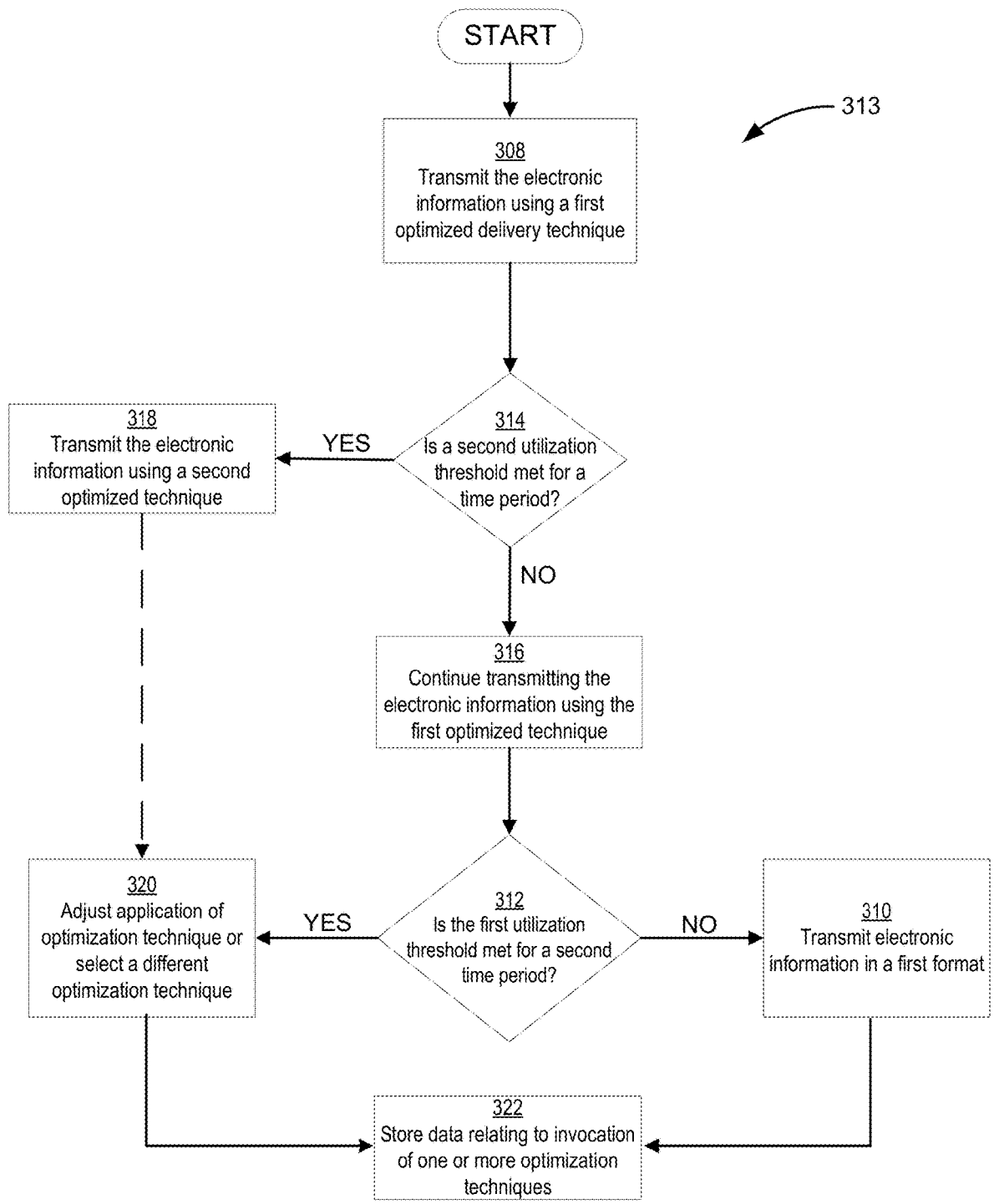
Figure 4:
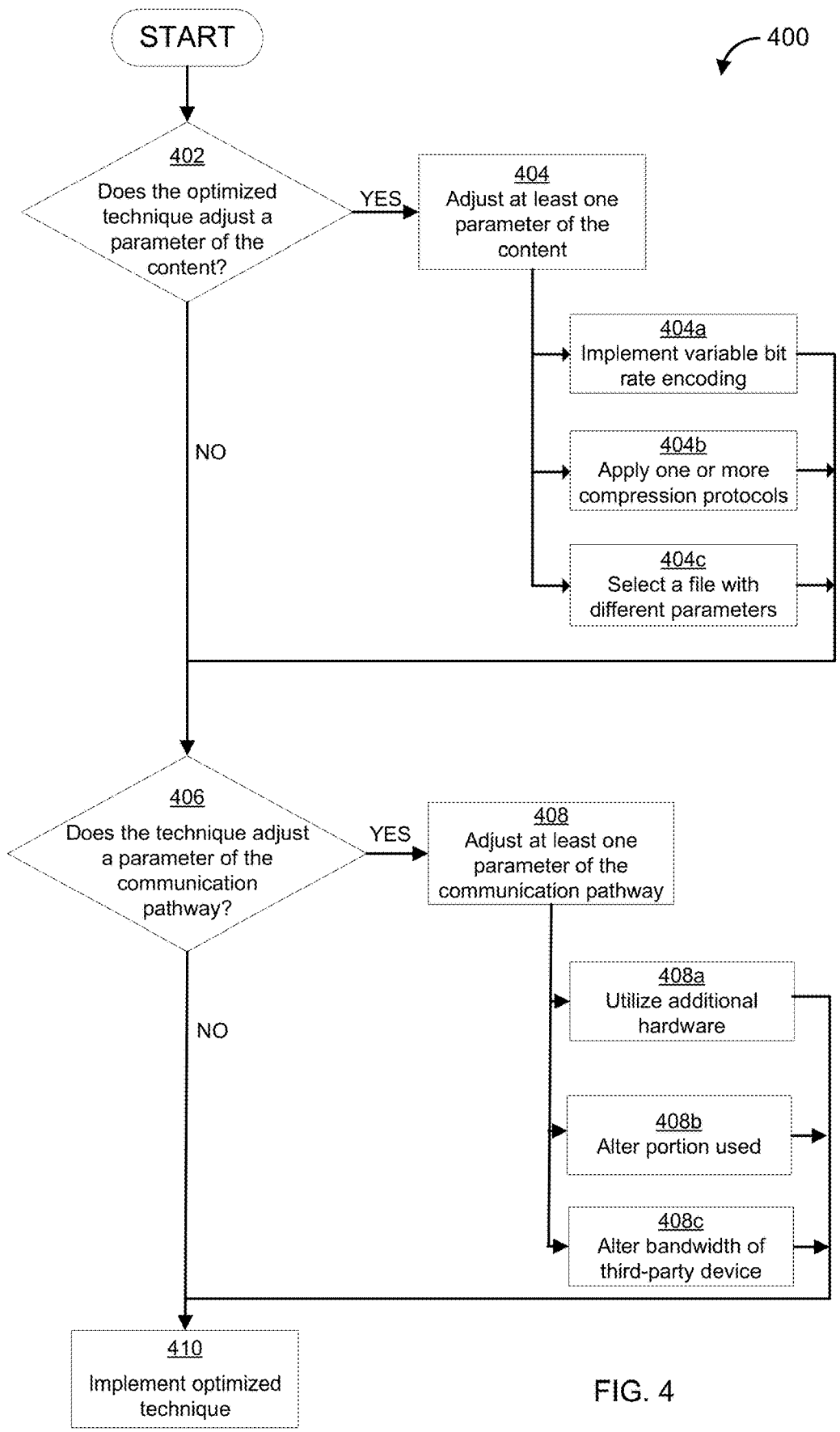
FIG. 4 is a flowchart that may be used to implement one or more illustrative aspects described herein.

FIG. 2 shows an exemplary network 201 (e.g., wide area network (WAN)) that may be utilized in one or more processes described herein, including the illustrative methods set forth in the flowcharts of FIG. 3 and/or FIG. 4. In one embodiment, exemplary network 201 comprises a processing device, such as processing device 203 that may be configured to provide one or more functionalities of a media terminal adapter and/or a set top box. In certain embodiments, device 203 may be located at one or more of various locations 102, including for example, 102a. In certain embodiments, exemplary network 201 may be in operative communication with network 100 and/or system 1000 shown in FIGS. 1A/B to receive media content. Exemplary aspects disclosed herein, including the flowchart shown in FIG. 3 will be explained in regards to an exemplary embodiment in which one or more components shown in FIG. 2 may be located at an end-user location, such as end-user location 1015 shown in FIG. 1B and/or location 102a of FIG. 1A. Those skilled in the art with the benefit of this disclosure, however, will readily understand that the illustrated embodiments are merely exemplary and are not intended to require one or more components shown in the network of FIG. 2 to be associated with the network 100 and/or system 1000 of FIG. 1A/B.

FIGS. 3A-3B are flowcharts of illustrative methods that may be implemented in accordance with various embodiments. The flowcharts of FIGS. 3A-3B are shown on different sheets to more readily convey certain aspects of this disclosure to the reader, however, persons of ordinary skill in the art having the benefit of this disclosure will appreciate that any combination of the disclosed processes shown in FIGS. 3A-3B may be deployed as a uniform method. Yet in other embodiments, any portion of one or more processes shown in FIGS. 3A-3B may be implemented as part of different methods, either at different time frames or simultaneously.

Looking first to FIG. 3A, a first request for electronic information may be received in accordance with one embodiment (see, e.g. block 302 of FIG. 3A). As explained below, however, requests are not required to be received before transmitting any electronic information, including the transmission of data using one or more optimized delivery techniques described herein. In one embodiment, data may comprise media content, such as audio and/or video content. The first request may be received (either directly or indirectly) from device 203. Device 203 may be any type of known computer, server, decoder, gateway, set top box, gateway, switch, or other computing device. Device 203 may also include a processor 211 for controlling overall operation of device 203. Device 203 may further include RAM 213, ROM 215, network interface 217, input/output interfaces 219 (e.g., keyboard, mouse, display, printer, etc.), and memory 221. I/O 219 may include a variety of interface units and drives for reading, writing, displaying, and/or printing data or files, as well as a camera (e.g., webcam), speaker, and/or microphone. In certain embodiments, device 203 may have received the request for the electronic information from another electronic device. For example, device 203 may comprise I/O 219 to communicate with peripherals including a television 207, laptop 209, desktop 205, and/or game console 240. As would be understood in the art, television 207 may include a remote control 208 for communicating with television 207 and communication with desktop 205 may occur via local access network (LAN) 204, which may include the use of wired and/or wireless communication protocols.

Memory 221 in device 203 may further store operating system software 223 for controlling overall operation of the computing device 203, control logic 225 for instructing device 203 to perform aspects as described herein, and other application software 227 providing secondary, support, and/or other functionality which may or may not be used in conjunction with various aspects described herein. The control logic may also be referred to herein as the server software 225. Functionality of the server software may refer to operations or decisions made automatically based on rules coded into the control logic, made manually by a user providing input into the system, and/or a combination of automatic processing based on user input (e.g., queries, data updates, etc.).

Memory 221 may also store data used in performance of one or more aspects of the disclosure, including a first database 229 and a second database 231. In some embodiments, the first database may include the second database (e.g., as a separate table, report, etc.). That is, the information can be stored in a single database, or separated into different logical, virtual, or physical databases, depending on system design. Devices 205, 207, 209, and/or 240 may have similar or different architecture as described with respect to device 203. Those of skill in the art will appreciate that the functionality of device 203 (or device 205, 207, 209, 240) as described herein may be spread across multiple computing devices.

The request for electronic information of block 302 may be transmitted through one or more components shown in network 201, which may comprise, for example, communication pathway 1014, 1016 and/or channel 101. The request may be received at any electronic device, including for example, service group node 1007, central system 1009, data center 103 (including one or more components of data center 103), among others. Any of the components of network 201 may be part of a wired or wireless network, a wide area network (WAN) 201, such as the Internet, a cable distribution network, fiber optic network, hybrid network, private intranets, corporate networks, LANs, wireless networks, personal networks (PAN), storage area networks (SAN), etc. Network 201 is for illustration purposes and may be replaced with fewer or additional networks. Device 203 may be connected to one or more of the networks via twisted pair wires, coaxial cable, fiber optics, radio waves, infrared, or other communication or transmission media. In this regard, a "network" as described herein and depicted in the drawings refers not only to systems in which remote devices are coupled together via one or more communication pathways, but also may include stand-alone devices that may be coupled, from time to time, to such systems. Consequently, a "network" includes not only a "physical network" but also a "content network," which is comprised of the data—attributable to an entity—which resides across all physical networks.

In response to the request, transmission of the requested data (or at least a portion thereof) may be initiated (see, e.g. block 304). In one embodiment, data may be transmitted to a different device than from which the request was sent. For example, in one embodiment, the request may have been received from computer 209; however, the requested data may be transmitted to television 207. Moreover, the request for the data may have been received through a first network/communication pathway, such as communication pathway 1016, however; at least a portion of the transmitted electronic information is transmitted through a second communication pathway, such as communication pathway 1014.

In certain embodiments, at least a portion of a network/communication pathway, such as communications pathway 1014 between the service group node 1007 and user equipment (which may be located at end-user location 1015) may not be configured or otherwise capable to transmit as much data as more regional or national communication pathways, such as the pathways between service group node 1007 and central system 1009. As more users demand content, more distribution nodes, such as service group nodes 1007, may need to be deployed. As an illustrative example, if communication pathway 1014 comprised coaxial cable, that portion of the pathway may deliver about 750 MHz of bandwidth in certain implementations. For example, the 750 MHz may be divided into individual channels. For example, a "standard definition" (NTSC, uncompressed) audio/video signal that may be viewed as a discrete channel may be allocated about 6 MHz of the bandwidth. In certain implementations providing standard definition NTSC signals, the number of discrete channels deliverable through communication pathway 1016 may be determined by the quantity of 6 MHz signals you could fit into the available bandwidth (which may also comprise digital signals or other analog electronic information).

For digital systems, certain implementations transmit about 40 Mbps of data through the same 6 MHz channel. While the above examples are illustrated by way of a coaxial cable, those skilled in the art will readily appreciate that any physical transport mechanism will have an upper limit of bandwidth. Further, while exemplary communication pathways may traverse the entire distance between a data source (e.g. a media content source) and an end user device, reference to a communication pathway within this disclosure does not imply an entire link between a data source and an end-user device to be implicated. Rather, in certain embodiments, a communication pathway may comprise only a portion of a link between two electronic devices in a network. Therefore, reference to a communication pathway between two devices or operatively connecting/connected to two devices does not require the inclusion of an entire link between the two devices but only a portion thereof.

In accordance with certain embodiments, block 306 may be implemented to determine whether a bandwidth utilization threshold of a network/communication pathway is met during a first time period. Block 306 may occur before blocks 302 and/or 304. For example, determination of whether a threshold is met may be determined before a request for electronic information is received and/or before receipt of requested electronic information. The determination may comprise a direct or indirect detection of one or more parameters relating to bandwidth utilization of the communication pathway. In this regard, one or more measurements may be obtained from different portions of the communication pathway. For example, in certain embodiments, data from different devices throughout a network may be utilized in the determination of block 306 and/or other processes described herein.

Often, communication pathways/networks that deliver media content to end-user devices are shared. For example, the media content may be multi-casted to several different end-user devices or locations. Looking to the illustrative example that may deliver 750 MHz of information spectrum, this may equate to about 5 Gbs of useable digital bandwidth. Because end user location 1015 is one of a plurality of end user locations in which the total bandwidth is allocated for the quantity of end user locations assigned or otherwise associated with a distribution node, such as service group node 1007, the actual available bandwidth may fluctuate over time (see also location 102*a* among several locations 102 of FIG. 1A). In one embodiment, media content may be transmitted using the DOCSIS protocol, such that multiple devices may recognize the received data packets, however, only a subset may be authorized or otherwise configured to decode them.

Because bandwidth is allocated to the plurality of end user locations (or at least devices associated with the end-user locations), the speed at which data may be transmitted to or from those devices may depend on the quantity of end-user locations or devices. Additional distribution nodes, such as service group node 1007 may be needed as populations demanding content grow. While basing the need on distribution nodes on estimated populations in an area may be beneficial, it may also be misleading because certain areas may have different usage patterns. In certain embodiments, a bandwidth utilization threshold may be measured at one or more locations. In one embodiment, measurements of one or more utilization parameters may be measured at multiple locations of communication pathway 1014 and/or 1016. One or more non-transitory computer-readable mediums having computer-executable instructions may be configured to, when executed by a processor, measure the utilization of network resources, including bandwidth at one or more locations. In one embodiment, utilization module 1018 of FIG. 1B, which may be located at service group node 1007 or any other location "upstream" of end-user location 1015, may be utilized. Utilization module 1018 may comprise hardware, software, firmware, and/or combinations thereof. In one embodiment, utilization module 1018 may detect and/or measure traffic transmitted through communication pathway 1014 and/or 1016. In yet another embodiment, measurements, either taken at a utilization module 1018 or another device, may be taken at central system 1009. For example, headers from packets transmitted to or from central system 1009 may be analyzed to determine if the information is being transmitted to an end-user location or device associated with service group 1007. Those skilled in the art with the benefit of this disclosure will appreciate that different parameters may be measured at one or more different locations throughout the exemplary system of FIG. 1B.

In one embodiment, the bandwidth utilization threshold may be about 70% of the available bandwidth. In some embodiments, the threshold may be about 75%, 80%, 85%, 90% or 95% of the available bandwidth, or any threshold an operator determines is useful. The determination of available bandwidth may be based upon historical data, sensors, or combinations thereof. Those skilled in the art will readily appreciate with the benefit of this disclosure that the threshold may be selected based upon one or more considerations, such as for example, the type of electronic information being transmitted, existing optimization being applied to the electronic information, historical utilization data, and combinations thereof.

If at block 306, it is determined that the threshold is met, certain embodiments may apply optimization techniques to transmit the requested content using less bandwidth. Exemplary optimization techniques that may be applied, include but are not limited to: 1) implementing variable bit rate encoding (for example, rather than constant bit rate encoding); 2) utilizing additional devices, such as, for example, 'standby' QAM modulators on a temporary basis; 3) applying one or more compression protocols to transport content, 4) selecting portions of the content stored at a lower resolution for transmission; and/or 5) combinations of the foregoing or other optimization techniques. Exemplary processes of optimized delivery techniques (such as, for example, those explained in reference to FIG. 4 below) may be based, at least in part, upon one or more considerations, including properties of data, the network/communication pathway(s), desired or targeted end-results, or combinations thereof. For example, electronic information relating to the requests for data may be utilized as could current or desired bandwidth utilization parameters. In other embodiments, a desired or targeted resolution of media content within the data at the consumption point (e.g., SD vs. HD vs. 3D) may be considered. In some embodiments, revenue generated and/or costs of implementing certain optimization techniques may be utilized in the selection of one or more optimized delivery techniques. Status of the data, such as storage and/or delivery restraints may also be a consideration. Further, in certain embodiments, status information relating an end user device (or an individual, such as a consumer, associated with one or more end user devices) may also be considered. Status information of an individual may include but is not limited to: past utilization, current utilization, tier classifications, subscription information, demographic information, and combinations thereof. Some exemplary considerations may include predictions relating to bandwidth usage for different time frames, including for example, hourly, daily, weekly, seasonally, prime time, seasonal, premier events, first runs, reruns and combinations thereof. Those skilled in the art with the benefit of this disclosure will readily appreciate that these are merely exemplary and that other factors, some of which will be explained below, may also be utilized without departing from the scope of this disclosure.

In one embodiment, an optimization engine, such as optimization engine 1017 may be selectively engaged. In certain embodiments, optimization engine 1017 may be located at a distribution node, such as service group node 1007, associated with the end-user location 1015. Optimization engine 1017 may comprise computer-executable instructions on a non-transitory computer-readable medium, that when executed by a processor generate or execute optimizing delivery techniques. In certain embodiments, one or more compression techniques may be implemented, either by optimization engine 1017 and/or other mechanisms. Turning briefly to FIG. 4, an exemplary method of implementing an optimization delivery technique is provided.

Specifically, FIG. 4 is a flowchart 400 showing an exemplary method of implementing one or more optimized delivery techniques according to an embodiment of the invention. Similar to the processes described (and will be described below) in relation to FIGS. 3A-3B, one or more processes of FIG. 4 may be performed independently or in combination with other processes, such as those disclosed in FIGS. 3A-3B. Modifications, including the addition, omission or rearrangement of one or more optimized delivery techniques described herein are contemplated and, therefore, are within the scope of this disclosure.

Block 402 may be implemented to determine whether to adjust a parameter of electronic content for a particular optimized technique (such as, for example, the media content delivered using the first or second optimized delivery techniques disclosed herein. The determination of block 402 may be based upon predefined instructions. For example, computer-executable instructions stored on a non-transitory computer-readable medium may be configured such that when executed by a processor, cause the processor to determine whether to adjust a parameter of the content. In one embodiment, the determination may be based upon detection of a utilization threshold value, such as discussed in relation to block 306 of FIG. 3A. Yet in other embodiments, at least a portion of the determination may be based upon the receipt of a user input indicative whether a parameter of the content is to be adjusted (or to what degree to adjust a parameter).

If at block 402 it is determined that an optimized delivery technique adjusts a parameter of the content, block 404 may be implemented. Block 404 may be performed without the implementation of block 402. For example, electronic signals instructing the adjustment of a parameter may be received without the determination of block 402. At block 404, one or more content parameters may be adjusted. The content may be a) data currently being transmitted through at least a portion of the communication pathway; b) data requested (but not yet transmitted) through at least a portion of the network/communication pathway; c) electronic information that is related to requested or received data (such as a different version or metadata relating to an audiovisual asset); or d) combinations thereof.

Block 404 may comprise one or more methods to adjust any parameter. Exemplary block 404a and/or 404b may be implemented as part of an adjustment. For example, block 404a may be implemented to adjust the data (e.g., a bit rate of media content). In this regard, media content may initially be transmitted at a constant bit-rate (such as the content in a first format transmitted at block 304 of FIG. 3A). Upon detection that a utilization threshold (such as the first threshold of block 306) has been met, at least a portion of the content may be transmitted at a variable bit rate. In another embodiment, data such as media content may initially be transmitted at a first variable bit-rate (such as the data transmitted at block 304 and/or 308 of FIG. 3A). Upon detection that a utilization threshold (such as the first threshold of block 306 or the second threshold of block 312) has been met, at least a portion of the data may be transmitted at a second variable bit rate. Therefore, the adjustment of the bit-rate may be binary, such that a specific variable bit-rate is either utilized or not, yet in other embodiments, different variable bit-rates may be implemented.

Block 404b may also be implemented, either independently of or in conjunction with 404a or any other process to apply (or adjust the application of) one or more compression protocols. As indicated above, a compression protocol may be engaged to convert the data from the first format to a first compressed format. The first format is not required to be in an uncompressed format. Rather, the first compressed format may comprise electronic information that is transmitted using a different compression technique (or combinations of compression techniques) than the electronic information transmitted if the first bandwidth utilization threshold was not met.

In one embodiment, optimization engine 1017 may comprise a compression engine configured to convert the content on a substantially real-time basis such that the end-user device may receive the content without any substantial interruptions. In certain embodiments, optimization engine 1017 may convert the content in such a manner that the occurrence of the conversion is not noticeable to an end-user at end-user location 1015. While optimization engine 1017 is shown as part of service group node 1007, those skilled in the art will readily understand that one or more optimization engines may be located at one or more locations "upstream" from end-user location, including but not limited to central system 1009.

In certain embodiments, block 304 is not initiated or otherwise required to precede block 306. For example, there is no requirement that the data be already transmitted to an end-user device before block 306 is initiated. For example, in one embodiment, upon receiving a new request for data, such as media content, block 306 may determine whether the bandwidth utilization threshold is met, and if so, transmit the requested data using an optimized delivery technique that would not have been transmitted if the bandwidth utilization threshold was not met. The compressed data may be compressed in real-time, such as for example, using optimization engine 1017. In other embodiments, instructions may be sent to one or more devices in system 1000 of FIG. 1B or network 200 of FIG. 2 configured to instruct one or more devices to compress the content.

Returning to FIG. 4, block 404c may be implemented to select data, such as a file, with entirely different parameters. The selection of a file may be part of block 306. For example, rather than apply an optimization technique to a stream of electronic information, a file may be selected that permits the delivery of the data using the first optimized delivery technique. In this regard, instead of adjusting data after an event, such as after a user requests the content and/or as the content is being transmitted through the communication pathway, certain embodiments may select electronic information (e.g., a file) that that has been preconfigured with adjusted parameters. For example, a first file of an audiovisual asset (such as a movie) may have a variable bit rate, whereas a second file may be compressed with a first compression protocol, and yet a third file may comprise a variable bit rate and be compressed with a second compression protocol. Those skilled in the art with the benefit of this disclosure will appreciate that the combinations of adjustable attributes or parameters of a file are abundant and that the above-referenced examples are merely exemplary.

Further, one or more versions of content may be stored on one or more non-transitory computer-readable mediums located throughout any device. In one embodiment, network backbone 1001 of central system 1009 may comprise one or more versions (e.g., different files) of the requested content. In one embodiment, two or more versions of the "compressed" data may require about the same bandwidth, however, differ in the compression technologies applied. For example, a first compressed version (whether pre-stored on a computer-readable medium before reception of the request or created after reception of the request) may be less "lossy" than a second version, however, incurs more processing power and/or incur a greater commitment of resources. In certain embodiments, a first compressed version of the data may be utilized when the threshold level is reached for a predetermined period of time, and a second compressed version is utilized if the utilization levels are not decreased over a period of time.

Implementing blocks 404a-404c as well as other processes for adjusting parameters of content is discretionary, such that combinations of adjustments are within the scope of the invention. If, however, it is determined not to adjust content parameters at block 402, further determinations may be made as whether to adjust other parameters. For example, in accordance with one embodiment, block 406 may be implemented to adjust at least one parameter of the network/communication pathway. Those skilled in the art will appreciate that block 408 or other processes determining whether to adjust parameters may be conducted before, after and/or during block 402. Further, it will be appreciated by those skilled in the art that in certain implementations, adjusting a parameter of content may be performed through or otherwise implicate adjusting at least a portion of the communication pathway (and vice-versa).

Block 408, which may be implemented without block 406, may adjust a parameter of the network/communication pathway. Block 408a may initiate the utilization of additional hardware, such as modulators and demodulators (e.g., QAM modulators and/or demodulators). For example, upon detection that a utilization threshold (such as described herein) has been met, a predefine quantity of modulators may be engaged. In some embodiments, block 408b may be implemented to adjust a portion of the communication pathway used to transmit the content. For example, a fiber optic medium may be utilized to transmit a portion of content previously transmitted through coaxial cable. In certain embodiments, at least a portion of bandwidth of the communication pathway in use by another entity or party, or requested to be used by another entity or party may be effected. For example, block 408c may be implemented to alter bandwidth available to other devices or groups of devices not associated with a device receiving the content of block 308 (and/or block 318, which is discussed below). In certain embodiments, one or more methods or systems may be implemented to: deny requests for use of bandwidth, add a new user, remove a user currently receiving content, and/or augment the bandwidth (increase or decrease) available to one or more users.

At block 410, an optimized delivery technique may be implemented. For example, data altered in accordance with block 404 may be transmitted through a communication pathway adjusted as part of block 408. There is no requirement that processes associated with block 410 be simultaneously performed. For example, in one embodiment, an optimized technique may comprise altered data with a first and a second adjusted parameter and the communication pathway may comprise a third adjusted parameter. In one embodiment, adjustment of each of these parameters may be implemented through different processes (which may occur at different times).

In certain embodiments, the data may continue to be transmitted without application or implementation of an optimized delivery technique (as opposed to transmitting content using the first optimized delivery technique of block 308) if it is determined that the threshold is not met (see, for example, block 310). In one embodiment, the transmitted content comprises a file selected at block 404c of FIG. 4, which was described earlier in this disclosure. Further, block 312 may be implemented to determine if the bandwidth utilization threshold is still met at a second time period. Block 312 may implement one or more of the same techniques and/or processes implemented in block 306 to determine if the threshold is met and/or measure the bandwidth usage. Measurements may be taken at any time period, which may be repetitive or, alternatively, may fluctuate. In one embodiment, utilization measurements may be performed about every 1 minute, 5 minutes, 10 minutes, or 15 minutes. In certain embodiments, the determination of utilization may be performed more often during times of anticipated peak usage.

Applying on-demand optimization for transmission of content delivered through distribution nodes may allow end-users to enjoy the best quality programming at certain times while reducing the need for dedicated software and hardware resources (e.g., additional QAM channels and QAM devices (for example, modulators and demodulators) at other times. In accordance with certain aspects, implementing one or more embodiments may allow for more reliable operation and improved service performance. In accordance with certain aspects disclosed herein, embodiments may provide the ability to quickly and easily reallocate resources (e.g., QAM channels) for different uses. In certain embodiments, if a determination at block 312 is such that the first threshold is met, block 308 may be implemented. Yet, a determination at block 312 that the threshold is no longer met may result in "throttling back" on one or more optimization techniques or systems. In one embodiment, one or more processes disclosed in FIG. 4 may be implemented to adjust, alter, remove, or otherwise modify delivery of content.

In this regard, aspects of this disclosure relate to selectively engaging and disengaging optimization techniques. For example, optimizing techniques may be employed in times of high demand and disengaged during period of relatively lower demands. In one embodiment, one or more optimization techniques for transmission of electronic information may be implemented when demand and/or utilization reaches or surpasses a first threshold, such as for example, 80% and disengaged or removed upon utilization being at or below a threshold value, such as for example, 55%. In one embodiment, one or more optimization techniques may be applied upon detecting utilization levels are at or above 80% and would remain fully engaged until utilization fell below 55%, however, engaging/disengaging of optimization techniques may be implemented in other arrangements that are more complex. Non-limiting examples of engaging and altering engagement of optimized delivery techniques are discussed herein with reference to FIG. 4. In certain embodiments, the intensity or level of engagement may vary based upon the utilization threshold. In one embodiment, upon detecting utilization and/or demand are at or above the first threshold (e.g. 80%), a first optimization technique may be implemented at a 100% intensity level. The intensity level may be decreased upon detecting a reduced utilization level, such as for example 65%, and further decreased or disengaged at an even more reduced utilization level, such as for example 50%. Yet in other embodiments, different optimization techniques may be employed based upon the level of utilization or demand.

FIG. 3B shows flowchart 313 which may be implemented independently of or in conjunction with one or more processes shown in flowchart 300 of FIG. 3A. For example, block 308 may be implemented (or already being utilized) to transmit data using a first optimization technique. At block 314, it may be determined whether a second bandwidth utilization threshold is met. In one embodiment, aspects of block 314 may be substantially similar to block 306 discussed above in relation to FIG. 3A. The utilization threshold of block 314 may relate to one or more different locations on a communication pathway/network, which may include at least a portion of the same locations where measurements may have been received (such as in relation to block 306). In yet another embodiment, one or more measurements in relation to block 314 may be independent of measurements of block 306. In one embodiment, the second threshold may be indicative of a higher utilization than indicated by the first threshold. For example, in one embodiment, the first threshold may be about 75% utilization while the second threshold is about 80% utilization. This example is merely illustrative, and those skilled in the art with the benefit of this disclosure will appreciate that the second threshold may be any threshold that differs, albeit even slightly, than the first threshold.

Determinations of whether a second utilization threshold has been met (such as at block 314) may be implemented or otherwise performed before, during, or after one or more of the other processes disclosed herein or other processes conducted on a network. In one implementation, block 314 may be performed substantially simultaneously with block 306, such that blocks 306/314 may be a single process. In this regard, one embodiment may closely resemble the flowchart of FIG. 3A in which block 306 comprises block 314. In another embodiment, block 314 may be implemented before block 310. In another embodiment, implementation of block 314 may be triggered by one or more events, such as a determination at block 306 that a first threshold has been met. For example, block 314 may be implemented upon detecting that a first threshold has been met. In other embodiments, the implementation of 314 may be based, at least in part, upon an estimated or actual value of bandwidth utilization. For example, if a first threshold is set at 70% bandwidth utilization, and bandwidth utilization is detected (for example at block 306) at 75%, then one or more processes may implement block 314 every 10 minutes, whereas if the bandwidth utilization was detected at block 306 to be 80%, then block 314 may be implemented at a shorter interval, such as for example, 5 minutes.

Data may be delivered using a second optimized delivery technique if it is determined that the second threshold was met (see, e.g., block 318). The second optimized delivery technique may be implemented by applying variations of one or more optimization techniques that may have been applied at block 306. Yet in other embodiments, one or more different optimization techniques may be applied at block 318, including but not limited to any processes explained in reference to FIG. 4. For example, in one embodiment, a different version of the data (or portion thereof) may be selected or generated. Regardless of what version is selected or generated, the data may be forwarded to as many interfaces as needed, for example, via additional routing/splitting functions of any device shown in FIGS. 1B and/or 2. Once the signals reach their destination, the data (e.g., television programs, video on demand, audio channels, video telephony data, etc.) within the data may be delivered to one or more devices, such as television 207 shown in FIG. 1B and/or one or more devices at exemplary location 102a of FIG. 1A.

In certain embodiments, if it is determined that the second threshold was not met, then content may continue to be delivered using the first optimized delivery technique (see, e.g., block 316). Additional processes may also be implemented. For example, one or more processes, such as described in relation to block 312, may be implemented in conjunction with or independently from block 314. For example, a determination that a second threshold was not met at block 314 may result in the determination whether the first utilization threshold is met. In this regard, block 312 may be performed before block 316.

If it is determined that a utilization threshold (for example, the first or the second utilization threshold) has been met for an extended period of time or meets other criteria, block 320 and/or other processes may be implemented to adjust one or more parameters of an optimized delivery technique. Block 320 may also be triggered by another event or external factors besides utilization thresholds, such as time of the day (e.g., primetime), day of the week (e.g., Friday night vs. Monday morning), problems with the communication pathway/network (anticipated and not anticipated), properties of data, desired or targeted end-results, or combinations thereof. Adjustment or replacement of an optimized delivery technique may be conducted through one or more different methodologies. As discussed above, an optimization technique for transmission of electronic information may apply one or more compression protocols (see, i.e., block 404b) and implement variable rate encoding (see, i.e., block 404a), however, these protocols may require more resources (either physical and/or financial) than a second optimization technique. Therefore, block 320 may adjust the application of the optimization technique. Alternatively, block 320 may select or otherwise implement another optimization technique.

Aspects of this disclosure relate to the utilizing information regarding invocations of one or more optimization techniques. In one embodiment, information pertaining to invocations of optimizing techniques may be utilized as part of determinations for expanding and/or updating a network. For example, block 322 of FIG. 3B may be implemented to store and/or transmit information regarding invocations that impact one or more portions of a communication pathway/network. Although block 322 is shown as possibly being implemented following block 310 and 320, those skilled in the art will appreciate that the collection, transmission, and/or utilization of information relating to invocations of optimization techniques may be conducted at other times, including any one of the blocks and/or decisions shown in FIGS. 3A, 3B and 4. In certain embodiments, characteristics regarding invocations may be utilized in determinations of expanding and/or upgrading components of a network. Such characteristics may include, but are not limited to: the quantity of invocations, frequency of invocations, durations of invocations, timing (e.g., time of day, days of the week, etc.) of invocations, and/or other characteristics. In one embodiment, the quantity and or type of invocations may indicate a need to expand the physical capacity of at least a portion of a delivery network. Various embodiments of this disclosure may be utilized to track the engagement of optimization techniques and use this information as part of one or more decisions relating to install or modify permanent infrastructure that may be needed to address growth in demand for bandwidth for one or more communication pathways.

Although aspects of the disclosure have been described using exemplary devices found in the illustrative networks, disclosed aspects are also applicable to other systems. Further, while the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
sending, to an end device and via a network, a first portion of a content item;
determining a first quantity of data transmitted via the network during a first time period;
determining, based on the first quantity of data transmitted during the first time period, that a first bandwidth utilization threshold of the network has been satisfied; and
sending, to the end device and via the network, a first optimized version of a second portion of the content item.

2. The method of claim 1, wherein the determining that the first bandwidth utilization threshold of the network has been satisfied comprises:
determining that sending one or more additional portions of the content item would cause the network to become congested.

3. The method of claim 1, wherein the determining that the first bandwidth utilization threshold of the network has been satisfied comprises:
determining that sending one or more additional portions of the content item would cause a slowdown in content delivery via the network.

4. The method of claim 1, wherein the first optimized version of the second portion of the content item comprises a smaller quantity of data than the second portion of the content item.

5. The method of claim 1, further comprising:
determining a first time frame during which an optimized delivery technique should be used; and
based on a determination that a current time is within the first time frame, sending, to the end device and via the network, a first optimized version of a third portion of the content item.

6. The method of claim 5, wherein the determining the first time frame comprises determining the first time frame based on an expected bandwidth utilization of the network.

7. The method of claim 5, wherein the determining the first time frame comprises determining the first time frame based on historical bandwidth utilization information.

8. The method of claim 5, wherein the determining the first time frame comprises determining the first time frame based on a scheduled event requiring increased bandwidth usage.

9. An apparatus comprising:
one or more processors; and
memory storing instructions that, when executed by the one or more processors, cause the apparatus to:
send, to an end device and via a network, a first portion of a content item;
determine a first quantity of data transmitted via the network during a first time period;
determine, based on the first quantity of data transmitted during the first time period, that a first bandwidth utilization threshold of the network has been satisfied; and
send, to the end device and via the network, a first optimized version of a second portion of the content item.

10. The apparatus of claim 9, wherein the instructions, when executed by the one or more processors, cause the apparatus to determine that the first bandwidth utilization threshold of the network has been satisfied by determining that sending one or more additional portions of the content item would cause the network to become congested.

11. The apparatus of claim 9, wherein the instructions, when executed by the one or more processors, cause the apparatus to determine that the first bandwidth utilization threshold of the network has been satisfied by determining that sending one or more additional portions of the content item would cause a slowdown in content delivery via the network.

12. The apparatus of claim 9, wherein the first optimized version of the second portion of the content item comprises a smaller quantity of data than the second portion of the content item.

13. The apparatus of claim 9, wherein the instructions, when executed by the one or more processors, further cause the apparatus to:
determine a first time frame during which an optimized delivery technique should be used; and
based on a determination that a current time is within the first time frame, send, to the end device and via the network, a first optimized version of a third portion of the content item.

14. The apparatus of claim 13, wherein the instructions, when executed by the one or more processors, cause the apparatus to determine the first time frame by determining the first time frame based on an expected bandwidth utilization of the network.

15. The apparatus of claim 13, wherein the instructions, when executed by the one or more processors, cause the apparatus to determine the first time frame by determining the first time frame based on historical bandwidth utilization information.

16. The apparatus of claim 13, wherein the instructions, when executed by the one or more processors, cause the apparatus to determine the first time frame by determining the first time frame based on a scheduled event requiring increased bandwidth usage.

17. A system, comprising:
a first computing device; and
a second computing device,
wherein the first computing device comprises:

one or more first processors; and first memory storing first instructions that, when executed by the one or more first processors, cause the first computing device to:

send, to the second computing device and via a network, a first portion of a content item;

determine a first quantity of data transmitted via the network during a first time period;

determine, based on the first quantity of data transmitted during the first time period, that a first bandwidth utilization threshold of the network has been satisfied; and send, to the second computing device and via the network, a first optimized version of a second portion of the content item, and wherein the second computing device comprises:

one or more second processors; and second memory storing second instructions that, when executed by the one or more second processors, cause the second computing device to:

receive, from the first computing device and via the network, the first portion of the content item.

18. The system of claim 17, wherein the first instructions, when executed by the one or more first processors, cause the first computing device to determine that the first bandwidth utilization threshold of the network has been satisfied by determining that sending one or more additional portions of the content item would cause the network to become congested.

19. The system of claim 17, wherein the first instructions, when executed by the one or more first processors, cause the first computing device to determine that the first bandwidth utilization threshold of the network has been satisfied by determining that sending one or more additional portions of the content item would cause a slowdown in content delivery via the network.

20. The system of claim 17, wherein the first optimized version of the second portion of the content item comprises a smaller quantity of data than the second portion of the content item.

* * * * *